Jan. 26, 1932.  H. L. WOOLFENDEN  1,842,740
GARAGE STRUCTURE
Filed Nov. 22, 1930  3 Sheets-Sheet 1
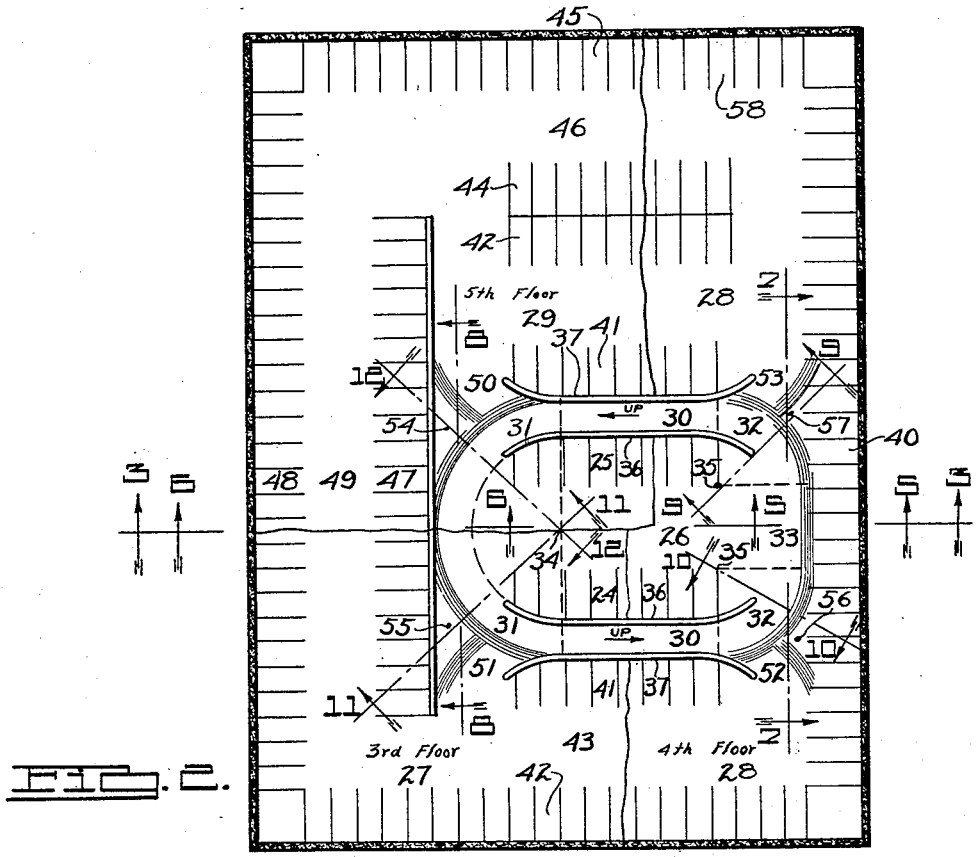
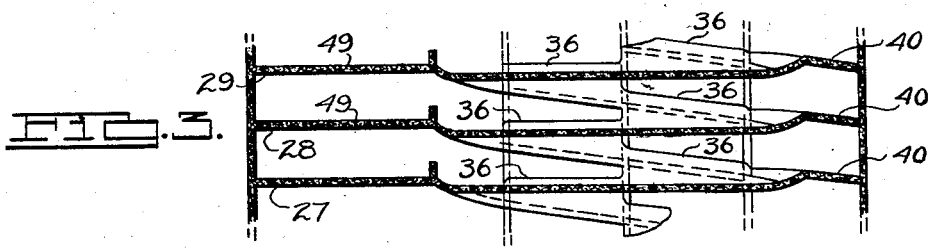
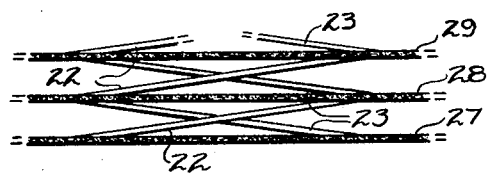
INVENTOR
Henry L. Woolfenden.
BY
ATTORNEYS.

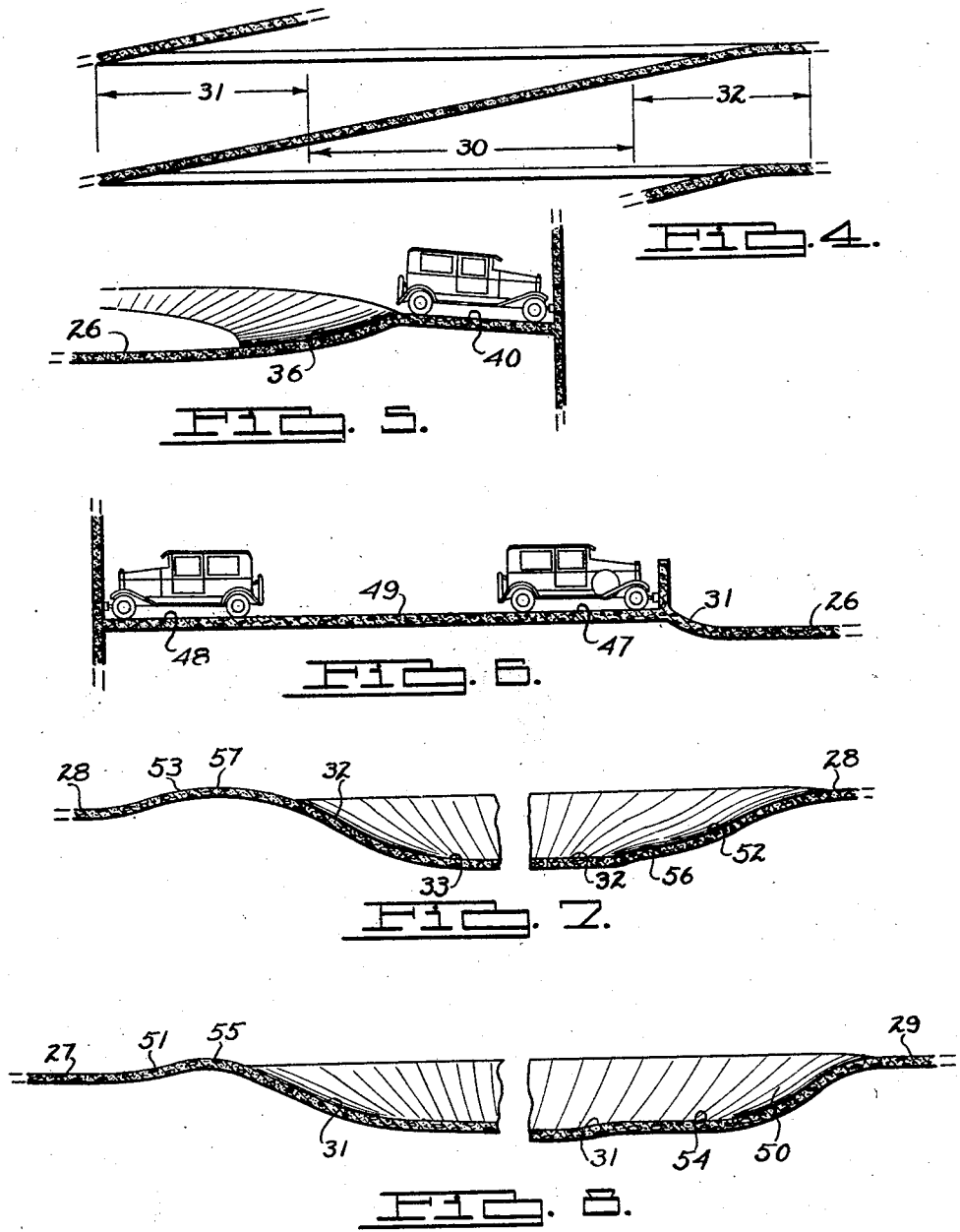

Jan. 26, 1932. H. L. WOOLFENDEN 1,842,740
GARAGE STRUCTURE
Filed Nov. 22, 1930   3 Sheets-Sheet 3

INVENTOR
Henry L. Woolfenden.
BY
ATTORNEYS.

Patented Jan. 26, 1932

1,842,740

UNITED STATES PATENT OFFICE

HENRY L. WOOLFENDEN, OF DETROIT, MICHIGAN

GARAGE STRUCTURE

Application filed November 22, 1930. Serial No. 497,343.

This invention relates to multi-story structures for the housing of motor vehicles, on which a system of ramps is used to permit the vehicles to travel from floor to floor under their own power, and constitutes a supplement to my Patent No. 1,749,743 issued March 11, 1930.

In the construction as described in my patent above referred to, the structure is provided with two series of oppositely inclined ramps, of which each ramp includes a relatively straight mid portion and curved end portions, the curved end portions of said ramp terminating at the connected floors in opposed and adjacent relationship to the curved end portions of the corresponding ramps of the other series and cooperating therewith to form a continuous path from floor to floor, and the curved end portions being preferably banked toward the center of curvature.

The structure as described also provides at each end of each ramp a curved pathway leading away from such ramp in a direction opposite to the direction of travel of a vehicle on the corresponding curved portion of the ramp, said curved pathway leading to the floor away from the ramp and being connected with the curved end portion by a path of travel. Thus a vehicle may enter or leave an adjacent ramp at a floor, or may pass such adjacent ramp by traveling consecutively over the curved pathway, the connecting path of travel, and the curved end of the adjacent ramp, and thence onto the curved end of the ramp farthest away from a given position on the floor.

It is obvious that at the lower end of each ramp, that is the end over which a vehicle leaves a floor when traveling up or approaches a floor when traveling down, the combination of the curved end of the ramp and the curved pathway from the ramp, together with the connecting path of travel, produces a "hump", the height of which depends on the relative length of the straight portion as compared with the curved end portions, also on the grade of the ramp, and also on the degree of banking used on the curved end portion and the curved pathway.

Under certain conditions the height of this "hump", or the vertical distance from the floor level to the connecting path of travel, becomes objectionable, provided the floor is substantially the same level between the ramps and in the areas reached by the curved pathway from the ramp. Also in cases where cars are parked adjoining the ends of the ramps, as in area 40 of Fig. 2 of above mentioned patent, the latter areas are generally at approximately the same level as the superelevation of the path of travel, and the parking areas connecting the general floor level with these higher parking levels, whether by step construction or by incline, cannot always be conveniently arranged without undesirable increase of building cost or lessening of parking efficiency.

The object of this invention is to provide a construction which will permit reducing or substantially eliminating the above referred to "hump" on the side on which the curved pathway leads from the ramp to the floor.

Another object is to provide a ramp structure having such paths of travel that a vehicle leaving any floor to enter a down ramp will not be required to pass over an appreciable rise or "hump" before starting down.

Another object is to provide parking areas so arranged that all such areas directly contacting with or adjacent to each other will be on substantially the same level, thereby avoiding the necessity of parking some of the cars on an objectionable incline connecting such parking areas of different levels, or of having a step, or abrupt change of level, between two cars parked in adjacent stalls or parking spaces.

A further object is to lessen the amount of warped surface required in the construction of the floors and the curved pathways, thereby reducing the cost of construction.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views,—

Fig. 1 is a more or less fragmentary diagrammatic sectional side elevation of a structure of the class described illustrating the two series of oppositely extending ramps with which the structure is provided.

Fig. 2 is a more or less diagrammatic broken plan view taken through a structure of the class described, certain floors thereof being broken away to better illustrate the present invention.

Fig. 3 is a vertical sectional view taken on the line 3—3 of Fig. 2.

Fig. 4 is a more or less diagrammatic developed vertical section taken through the center of the path of travel of the ramps shown in Fig. 2.

Fig. 5 is a sectional view taken on the line 5—5 of Fig. 2.

Fig. 6 is a sectional view taken on the line 6—6 of Fig. 2.

Fig. 7 is a sectional view taken on the line 7—7 of Fig. 2.

Fig. 8 is a sectional view taken on the line 8—8 of Fig. 2.

Figure 9:
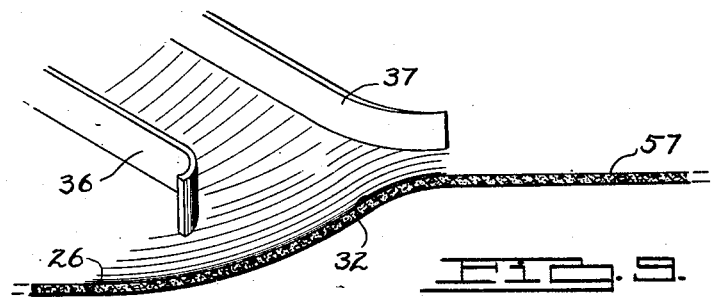
Fig. 9 is a sectional view taken on the line 9—9 of Fig. 2.

It is usual in structures of this class to provide a greater ceiling height for the first story, that is from the ground floor to the second floor, than for the floors above. This is due to the fact that a portion of the ground floor is ordinarily used for stores, shops, offices and the like. Also the location of the ramps is generally in the portion of the structure least desirable for such purposes, and the lowering of the level of the second floor in this part of the structure is therefore not objectionable. On the first, or ground floor, the floor would usually not be depressed, and it follows that the construction as described in this invention would therefore result in a beneficial reduction in grade from the ground floor to the second floor, or a shortening of the travel path between these floors, thus lessening or avoiding one of the difficulties of designing this part of the ramp system which is sometimes encountered due to said greater height of the first story of the structure.

Similarly, on the top floor of the structure, the lowering of the floor between the ramps, and the resultant lowering of the level of the super-elevation of the connecting pathways between the curved ends of the ramps, with respect to the roof above the top floor, will permit maintaining desired clearance between all points of said top floor and said roof, without the necessity, which would otherwise exist, of providing dimples in the ceiling above the upper ends of the ramps leading to said top floor, or of increasing the height of the top floor if it is desired to maintain full clearance above the super-elevated portions of the path.

As an illustration of the present invention I show in the accompanying drawings a garage structure which may be considered as having a plurality of generally horizontal floors 27, 28 and 29, which floors may be considered as having an extent commensurate with the ground area of the building. As shown diagrammatically in Fig. 1, two series of ramps 22 and 23 respectively connect the various floors 27, 28 and 29, the ramps 22 of one series, as viewed in Fig. 1, extending upwardly from left to right and the series 23 extending upwardly right to left, as viewed in Fig. 1, the respective ramps of each series being in vertical alignment with each other. Alternate ramps of each series 22 and 23 cooperate with alternate ramps of the other series to form two continuous superimposed driveways between the various floors, each driveway being adapted to handle vehicular traffic in one direction only, thereby providing entirely separate paths for up and down traffic. As indicated in Fig. 2, the series 22 and 23 of the ramps are separated from each other by a distance equal to the depth of the car stalls 24 and 25 plus the width of the aisleway 26. It will be obvious, however, that one or more rows of car stalls may be provided on either one or both sides of the aisle 26. The view in Fig. 2 is broken away to show fragments of the three floors 27, 28 and 29 which may be considered as the third, fourth and fifth floors respectively of a structure of the class described. One ramp of the series 22 is shown as connecting the third floor with the fourth floor, and one ramp of the series 23 is shown connecting the fourth floor with the fifth floor, the two ramps being considered as devoted to upgoing traffic only so that the traffic thereon will be deemed to travel in a counterclockwise direction, as viewed in Fig. 2; while the traffic on the ramps immediately above and below those indicated will be devoted to downgoing traffic only moving in a clockwise direction. Obviously, upgoing traffic may use the lane which gives it a clockwise direction of travel and downgoing traffic the lane which gives it a counterclockwise direction, if desired. Each of the ramps comprises a straight side portion 30 and curved end portions 31 and 32 respectively. In order to illustrate two modifications of the present invention I have shown the curved portions 31 of each ramp as extending to a point midway between the straight portions 30 of each series 22 and 23 so that the curved portions 31 actually meet with each other at such mid point, while the curved portions 32 of each ramp stop short of such mid point and the adjacent ends thereof may be connected together by a pathway such as 33 which in reality forms no part of the ramp itself, in that vehicles passing over the same are neither elevated or depressed relative to the adjacent floor. To further illustrate the difference between these two modifications, it may be assumed that the outer edge of the path of travel of the portions 31 for each pair of cooperating opposed ramps have a common center of curvature at 34, and that the outer edge of the path of travel of each curved portion 32 has its own circular center as at 35, the centers 35 being spaced from each other. The portions 30, 31 and 32 cooperate to form a single ramp upon which a vehicle traveling the same is continuously either ascending or descending, while a vehicle on the portion 33 connecting the portions 32 neither ascends or descends. By making the distance between the opposed straight portions 30 of opposite ramps the distance described, the maximum use of the floor space therebetween for storage purposes is obtained, and by curving the ends of the ramps inwardly, as described, the minimum of floor space, which will otherwise be useful for storage space, is utilized for the ramps themselves and in passing from one ramp to another ramp.

It will be understood, of course, that in any particular construction where the present invention is employed, the ramps will preferably be constructed with the straight portions 30 having their ends curved as at 31, or as at 32, and not both the curved portions 31 and 32, as illustrated, except in those cases where the variation in the two curved ends, as illustrated, may be found beneficial for some reason or another. Should it be found desirable to employ the curved end portions 31 in preference to the curved end portions 32, the alternate ramps of one series will cooperate with the alternate ramps of the opposed series to provide a continuously ascending or descending ramp extending from the bottom floor of the structure to the top floor, but where it is found desirable to employ the end portions 32, there will be a break in the ascent or descent upon reaching the portion 33 connecting the opposed portions 32 at each floor.

The ascent or descent of the portions 30, 31 and 32 are shown diagrammatically in Fig. 4 which may be taken as a slightly enlarged diagrammatic developed section through the center line of the path of travel of the portions 30, 31 and 32. It will be noted that the portions 30 and 31 provide a continuous ascent or descent on the same, while the end portion of the portion 32 where it joins with the portion 33 is gradually merged into the horizontal to provide a smooth curve meeting the portion 33 to obviate the sharp break in ascent and descent found in so many of the existing conventional ramp structures.

The portions 31 are banked downwardly towards the axis of the path of travel, starting from a minimum at or near the point of junction between the portions 31 and 30 to a maximum intermediate the portions 30, and where the curved portions 32 are employed, they are banked downwardly towards the axis of travel thereon from a minimum at or near the point of junction with the portions 30 to a maximum preferably at the point of junction with the portion 33, the portion 33 being banked also and preferably in accordance with the maximum banking of the portions 32. All points on the portions 31, 32 and 33 outwardly the inner edge of the path of travel of such portions are maintained at a superelevation with respect to the inner edge of the path of travel thereon.

The effect of this banking, together with the use of vertical curves wherever there is a change of grade, is to eliminate racking of vehicles in ascending or descending the ramps, to provide a maximum of comfort for the passengers, to shorten the distance traveled in going from floor to floor, and to greatly facilitate the flow of traffic in and out of the structure, all of which are factors of the greatest importance in deermining the commercial practicability of such a structure.

I also prefer to provide inner and outer abutments or railings 36 and 37 at the inner and outer edges of the path of travel along the straight portions 30 of each ramp and extending a short distance onto the curved portions 31 and 32.

Where conditions permit, which will usually be the case with a structure constructed in accordance with the present invention because of the relatively small area of ground surface enclosed between the two series of ramps, parking or storage areas on each floor outside of the path of travel on the ramps may be provided, and in Fig. 2 a number of variations in such storage areas are shown. In some instances it may be found advisable to form a storage area at the ends of the ramps, such as is indicated at 40 in Fig. 2, of a depth equal to the depth of one stall or more, in which case, a vehicle traveling on the ramps or connecting path may be driven directly into its stall on such storage area 40. In order to prevent any vehicle thus parked on the portion 40 from possibility of inadvertently rolling back into the travel lane, such portion 40 is preferably inclined downwardly away from the travel lane so that the natural tendency will be for the vehicle to move away from the travel lane. Storage areas such as 41 and 42 separated by aisleways 43 may also be provided outside of the side portions of the ramps, as indicated in Fig. 2, and where conditions permit, these may be supplemented by additional storage spaces 44 and 45 separated by aisleways 46, as illustrated in Fig. 2. Where a greater area at the end of the ramps than that shown at 40 is obtainable, one or more storage areas such as 47 and 48 separated by an aisleway 49 may be provided, as illustrated in Fig. 2. In such case suitable pathways leading to or from the adjacent portion of the ramp are provided for vehicles approaching a ramp or leaving the same. Such pathways may be as shown at 50, 51, 52 and 53 in the accompanying drawings. Each of these pathways preferably extends outwardly from each end of each straight portion 30 with approximately the same curvature in a horizontal plane as the corresponding portion 31 or 32, as the case may be, and each of these curved paths is preferably banked downwardly towards the axis of the path of travel thereon and merge at their ends into the level of the cooperating floor. A vehicle on one side of the building may pass, for instance, from the floor or storage space on that side of the building onto the curved pathway 50, onto the curved portions 31 between the corresponding ramps and onto the straight portion 30 of the ramp most remote from its original point of storage, or may pass into the aisleway 26 between the two series of ramps. This provides means whereby a vehicle passing from a floor to a ramp may easily reach the same from any point on the floor and it also provides means whereby any vehicle ascending or descending a ramp may pass directly to any point on any floor without interfering with the passage of other vehicles on the travel lane of the ramps. It will further be apparent, of course, that a vehicle traveling up any ramp may turn directly from the end of the ramp into the aisleway 26 and there proceed to the opposite end of the aisleway and there run onto the particular ramp leading down from such floor reserved for the use of downgoing vehicles only.

Referring to Fig. 2, it will be noted that the floor areas 24, 25, and 26 included between the ramps and the end connecting paths are separated by said ramps and connecting paths from the other floor areas 27, 28, 29, 40, 41, 42, 43, 44, 45, 46, 47, 48 and 49. Consequently the floor level of the areas 24, 25, and 26 may be lowered with reference to the remaining floor areas, without involving any difficulty through having any difference in level between parking areas which immediately adjoin each other.

In the structure described, the curved ends of the ramps, 31 and 32, are banked toward the center of curvature, the connecting pathway 33 is similarly banked, and the inner edge of the path of travel merges into the floor areas 24, 25 and 26, the outer edge of the path of travel is at a superelevation with respect to said floor areas 24, 25 and 26.

The present invention consists of providing a structure as above described in which all of the area 24, 25 and 26 between the ramps on any given floor is at the same elevation as the inner edge of the connecting path 33, or of the junction of two curved ends 32 and all of the other areas of said floor are at an elevation higher than said areas 24, 25 and 26, but not exceeding in amount the maximum superelevation of the outside edge of the travel path with reference to the inside edge of the travel path.

Figure 11:
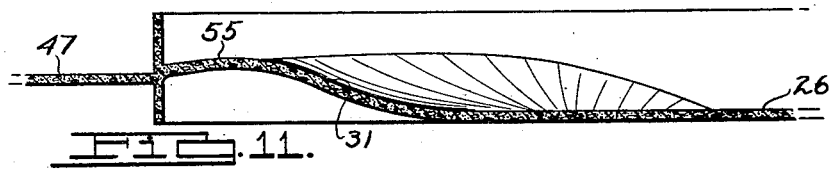
Fig. 11 is a sectional view taken on the line 11—11 of Fig. 2.
Figure 12:
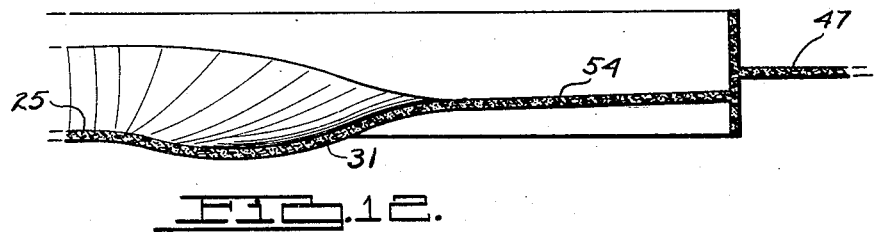
Fig. 12 is a sectional view taken on the line 12—12 of Fig. 2.

The accompanying drawings, particularly in Figs. 3, 6, 11 and 12, show the above difference in floor levels as being approximately the same as the maximum amount of superelevation, but it is evident that the difference may be less than that shown when considerations of design make it desirable to have less difference in levels.

Referring to Fig. 2, assume a car traveling up from the third floor to reach a parking stall 58 on the fourth floor. In traveling over the connecting path 33, the car will be toward the outer, or superelevated side of the travel path, and when approaching path 57 the car will be virtually at the elevation of 57. When passing from 57 to 53, the elevation attained will be substantialy maintained, instead of debouching downward to the floor 28, since the floor 28 will be of the same approximate elevation as the outside edge of 33. This is shown in Fig. 7, where it will be noted that the "hump" of my previous patent at 57 is practically eliminated.

Figure 10:
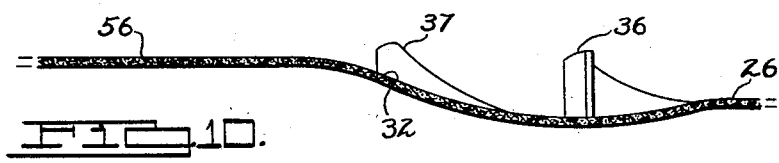
Fig. 10 is a sectional view taken on the line 10—10 of Fig. 2.

It should be noted that in all the drawings showing the superelevation, and particularly Figs. 7, 8, 9, 10, 11 and 12, the vertical scale is much exaggerated, in order to show more clearly the effect of the banking, and in the actual construction all the changes of elevation are gradual and not in any sense abrupt.

Formal changes may be made in the specific embodiment of the invention described, without departing from the spirit or substance of the broad invention, the scope of which is commensurate with the following claims.

I claim:—

1. In combination, a substantially horizontal floor, a pair of ramps inclined upwardly relative to said floor and a pair of ramps inclined downwardly relative to said floor, one ramp of one of said pairs being superposed relative to one ramp of the other of said pairs, and an end portion of one ramp of each of said pairs merging into said floor in opposed and adjacent relationship with an end portion of one ramp of the other of said pairs, that portion of said floor substantially bounded by said ramps in plan view being vertically displaced relative to the general level of said floor, and the inner edge of the corresponding ends of said ramps merging into said portion of said floor.

2. In combination, a substantially horizontal floor, a pair of ramps inclined upwardly relative to said floor and a pair of ramps inclined downwardly relative to said floor, one ramp of one of said pairs being superposed relative to one ramp of the other of said pairs, and an end portion of one ramp of each of said pairs merging into said floor in opposed and adjacent relationship with an end portion of one ramp of the other of said pairs, that portion of said floor substantially bounded by said ramps in plan view being vertically depressed relative to the general level of said floor, and the inner edge of the corresponding ends of said ramps merging into said portion of said floor.

3. In combination, a substantially horizontal floor, a pair of ramps inclined upwardly relative to said floor and a pair of ramps inclined downwardly relative to said floor, one ramp of one of said pairs being superposed relative to one ramp of the other of said pairs, and an end portion of one ramp of each of said pairs merging into said floor in opposed and adjacent relationship with an end portion of one ramp of the other of said pairs, that portion of said floor substantially bounded by said ramps in plan view being vertically depressed relative to the general level of said floor, the inner edge of the corresponding ends of said ramps merging into said portion of said floor, and the outer edge of the path of travel on said ends of said ramps being merged into said general level of said floor.

4. In combination wth a generally level floor having a ramp leading downwardly therefrom and a ramp leading upwardly therefrom, the adjacent ends of said ramps being spaced from each other, said ramps substantially enclosing a portion of said floor between them in plan view, said portion of said floor being depressed below the general level of said floor, and the inner edge of the path of travel connecting said adjacent ends of said ramps merging into said portion over a material distance.

5. In combination with a generally level floor having a ramp leading downwardly therefrom and a ramp leading upwardly therefrom, the adjacent ends of said ramps being spaced from each other, said ramps substantially enclosing a portion of said floor between them in plan view, said portion of said floor being depressed below the general level of said floor, the inner edge of the path of travel connecting said adjacent ends of said ramps merging into said portion over a material distance, and the outer edge of the path of travel connecting said adjacent ends, being merged into the general level of said floor.

6. In combination with a building having a plurality of superposed floors, a ramp structure comprising two series of oppositely inclined ramps, one ramp of each of said series connecting adjacent floors, each ramp terminating at each floor in opposed and adjacent relationship to the end of a co-operating ramp of the other of said series, that portion of each floor substantially bounded by said ramps in plan view being depressed below the general level of such floor, and the end portions of said ramps merging at their inner and outer edges into the plane of said portion of said floor and the general level of said floor, respectively.

7. In combination, a substantially horizontal floor, a pair of ramps inclined upwardly relative to said floor and a pair of ramps inclined downwardly relative to said floor, each of said ramps comprising a straight portion and curved end portions, one ramp of each of said pairs being superposed relative to one ramp of the other of said pairs, one of said curved ends of each of said ramps merging into said floor in opposed and adjacent relationship with respect to a curved end portion of one of said ramps oppositely inclined relative thereto, that portion of said floor substantially enclosed between said ramps in plan view being vertically displaced from the general level of said floor, and one edge of said curved end portions merging into said floor being merged into said portion of said floor.

8. In combination, a substantially horizontal floor, a pair of ramps inclined upwardly relative to said floor and a pair of ramps inclined downwardly relative to said floor, each of said ramps comprising a straight portion and curved end portions, one ramp of each of said pairs being superposed relative to one ramp of the other of said pairs, one of said curved ends of each of said ramps merging into said floor in opposed and adjacent relationship with respect to a curved end portion of one of said ramps oppositely inclined relative thereto, that portion of said floor substantially enclosed between said ramps in plan view being vertically depressed from the general level of said floor, the inner edges of said curved end portions merging into said floor being merged into said portion of said floor, and the outer edges of said curved end portions merging into said floor being merged into the general level of said floor.

HENRY L. WOOLFENDEN.